US009875585B2

(12) United States Patent
de Swardt et al.

(10) Patent No.: US 9,875,585 B2
(45) Date of Patent: Jan. 23, 2018

(54) VEHICLE VIDEO DISPLAY VERIFICATION SYSTEM

(71) Applicant: Lang-Mekra North America, LLC, Ridgeway, SC (US)

(72) Inventors: Rolf Reitz de Swardt, Blythewood, SC (US); Premchand Krishna Prasad, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 262 days.

(21) Appl. No.: 14/719,585

(22) Filed: May 22, 2015

(65) Prior Publication Data

US 2015/0350613 A1 Dec. 3, 2015

Related U.S. Application Data

(60) Provisional application No. 62/004,301, filed on May 29, 2014.

(51) Int. Cl.
*H04N 7/18* (2006.01)
*H04N 5/64* (2006.01)
*H04N 5/225* (2006.01)
*G07C 5/08* (2006.01)
*B60R 1/00* (2006.01)

(52) U.S. Cl.
CPC .............. *G07C 5/0866* (2013.01); *B60R 1/00* (2013.01)

(58) Field of Classification Search
CPC ......... G06C 5/0866; G06F 1/28; B60C 23/00; G08B 1/08
See application file for complete search history.

(56) References Cited

U.S. PATENT DOCUMENTS

| 7,353,086 B2 | 4/2008 | Ennis |
| 7,898,398 B2* | 3/2011 | DeLine ................. B60K 35/00 340/425.5 |
| 8,054,168 B2 | 11/2011 | McCormick et al. |
| 8,412,413 B1 | 4/2013 | Stark et al. |
| 8,427,288 B2 | 4/2013 | Schofield et al. |
| 8,467,324 B2 | 6/2013 | Yousefi et al. |

(Continued)

FOREIGN PATENT DOCUMENTS

| JP | 5345547 A | 12/1993 |
| JP | 2000242896 A | 9/2000 |

(Continued)

*Primary Examiner* — Sath V Perungavoor
*Assistant Examiner* — Patricia I Young
(74) *Attorney, Agent, or Firm* — McNair Law Firm, P.A.; Seann P. Lahey

(57) ABSTRACT

A vehicle video display verification system, comprising a camera carried by the vehicle; a display unit positioned in the vehicle displaying images captured by said camera; a verification sensor monitoring the status of image information from said camera being displayed on said display unit; and, a video control unit receiving said image information from said camera and outputting said image information to said display unit, and receiving feedback information from said verification sensor; wherein said video control unit records said image information from said camera and said feedback information from said verification sensor for establishing confirmation of an image display status on said display unit in the event of a vehicle accident.

18 Claims, 3 Drawing Sheets

(56) References Cited

U.S. PATENT DOCUMENTS

| | | | |
|---|---|---|---|
| 2003/0090568 A1 | 5/2003 | Pico | |
| 2009/0009321 A1* | 1/2009 | McClellan | G08G 1/207 340/539.13 |
| 2009/0326727 A1* | 12/2009 | Gothard | G06F 1/263 700/292 |
| 2013/0135473 A1 | 5/2013 | Lin et al. | |

FOREIGN PATENT DOCUMENTS

| | | |
|---|---|---|
| WO | 2007066064 A1 | 6/2007 |
| WO | 2010050012 A1 | 5/2010 |

* cited by examiner

VEHICLE VIDEO DISPLAY VERIFICATION SYSTEM

BACKGROUND OF THE INVENTION

1) Field of the Invention

The present invention relates to vehicle camera and display systems, and more particularly, to a system for verifying whether an image from a camera on the vehicle was being displayed on a monitor viewable by the driver at the time of a vehicle accident.

2) Description of Related Art

Mirror systems on vehicles protrude from the vehicle and cause significant air resistance with a negative effect on fuel consumption, particularly on large commercial vehicles that utilize large mirror systems. One solution has been the increasing use of cameras for vehicle navigation, which are generally smaller and have therefore less negative effect on vehicle fuel consumption. A problem arises, however, with vehicle camera systems and associated displays/monitors in that they currently do not prove that the monitor inside the vehicle was on and displaying the camera images to the driver in the event of an accident.

Thus, what is needed is a system able to capture images, signals, and other feedback information from the vehicle, vehicle cameras, and displays to definitively state whether a vehicle display was showing a camera image to a driver at the time of a vehicle accident.

Accordingly, it is an object of the present invention to provide a vehicle video display verification system able to capture definitive information from the vehicle systems and display equipment as to the status of images being displayed on a monitor in the vehicle.

SUMMARY OF THE INVENTION

The above objective is accomplished according to the present invention by providing a vehicle video display verification system comprising a camera carried by the vehicle; a display unit positioned in the vehicle displaying images captured by said camera; a verification sensor monitoring the status of image information from said camera being displayed on said display unit; and, a video control unit receiving said image information from said camera and outputting said image information to said display unit, and receiving feedback information from said verification sensor; wherein said video control unit records said image information from said camera and said feedback information from said verification sensor for establishing confirmation of an image display status on said display unit in the event of a vehicle accident.

In a one embodiment, the verification sensor comprises a secondary camera positioned within the vehicle capturing an image of said display unit in operation.

In a one embodiment, the verification sensor is included in said display unit and is configured to determine an on/off status of a display panel of said display unit.

In a one embodiment, the verification sensor comprises an electrical current sensor configured to determine the flow of electrical current along electrical wire transmitting said image information from said camera to said display unit.

In a one embodiment, the verification sensor comprises a light sensor mounted in front of said display unit and configured to determine the output of light from said display unit.

In one embodiment, the video control unit is configured to continuously receive and continuously record said image information from said camera and said feedback information from said verification sensor.

In one embodiment, the video control unit is further configured to receive and record vehicle status information from at least one vehicle sensor to determine if a vehicle crash event has occurred.

In one embodiment, the video control unit is in electronic communication with the vehicle CAN bus for receiving said vehicle status information.

In one embodiment, the at least one vehicle sensor includes an impact sensor in electronic communication with said video control unit.

In one embodiment, the at least one vehicle sensor includes an accelerometer in electronic communication with said video control unit.

In one embodiment, the video control unit is further configured to save the recorded said image information, said feedback information and said vehicle status information on a storage media for a predetermined time period before and after determination of said vehicle crash event in a manner to prevent overwriting of the saved information.

In one embodiment, the storage media includes a flash memory card removably carried by said video control unit.

In one embodiment, the system includes a manual trigger switch in electronic communication with said video control unit, wherein said video control unit is further configured to save the recorded said image information, said feedback information and said vehicle status information on said storage media for a predetermined time period before and after actuation of said manual trigger switch.

In one embodiment, the system includes a battery backup power supply operatively associated with said video control unit for continued operation of said video control unit when vehicle power is lost.

In a preferred embodiment, the vehicle video display verification system comprises a camera carried by the vehicle capturing images of an exterior area around the vehicle and transmitting image information; a display unit positioned in the vehicle displaying said image information captured by said camera; a video control unit configured to receive and process said image information from said camera and output the processed said image information to said display unit so that said image information is provided to said display unit in a format capable of display by said display unit; a secondary camera carried by the vehicle being positioned to capture images of said display unit displaying image information from said camera, wherein said images captured by said secondary camera define feedback information transmitted to said video control unit; a vehicle sensor in electronic communication with said video control unit, wherein said vehicle sensor is configured to determine a change in vehicle status and transmit vehicle status information; wherein said video control unit is further configured to determine when a vehicle crash event has occurred based on said vehicle status information from said vehicle sensor; and, wherein said video control unit is further configured to record said image information, said feedback information, and said vehicle status information; and, wherein said video control unit is further configured to save the recorded said image information, said feedback information, and said vehicle status information on a storage media operatively associated with said video control unit for a predetermined time period both before and after determination of said vehicle crash event.

Accordingly, the video control unit interfaces with the vehicle electronic systems (i.e. connects to the vehicle CAN bus and sensors) for receiving various bits of vehicle status information (i.e.: time, speed, impact) for recording. The video control unit also receives the camera image signals and display unit feedback information for recording. The video control unit records continuously. A vehicle crash event can be triggered by a vehicle sensor (i.e.: impact sensor, airbag sensor, and the like) connected directly to the video control unit or through the interface to the vehicle electronic systems. When an event is triggered, the video control unit will save data for a defined time period before and after the event trigger on a storage media in a manner to prevent overwriting of the data.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment(s) and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention. Likewise, other objects, features, benefits and advantages of the present invention will be apparent from this summary and certain embodiments described below. Such objects, features, benefits and advantages will be apparent from the above in conjunction with the accompanying examples, figures and all reasonable inferences to be drawn therefrom.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Figure 1:
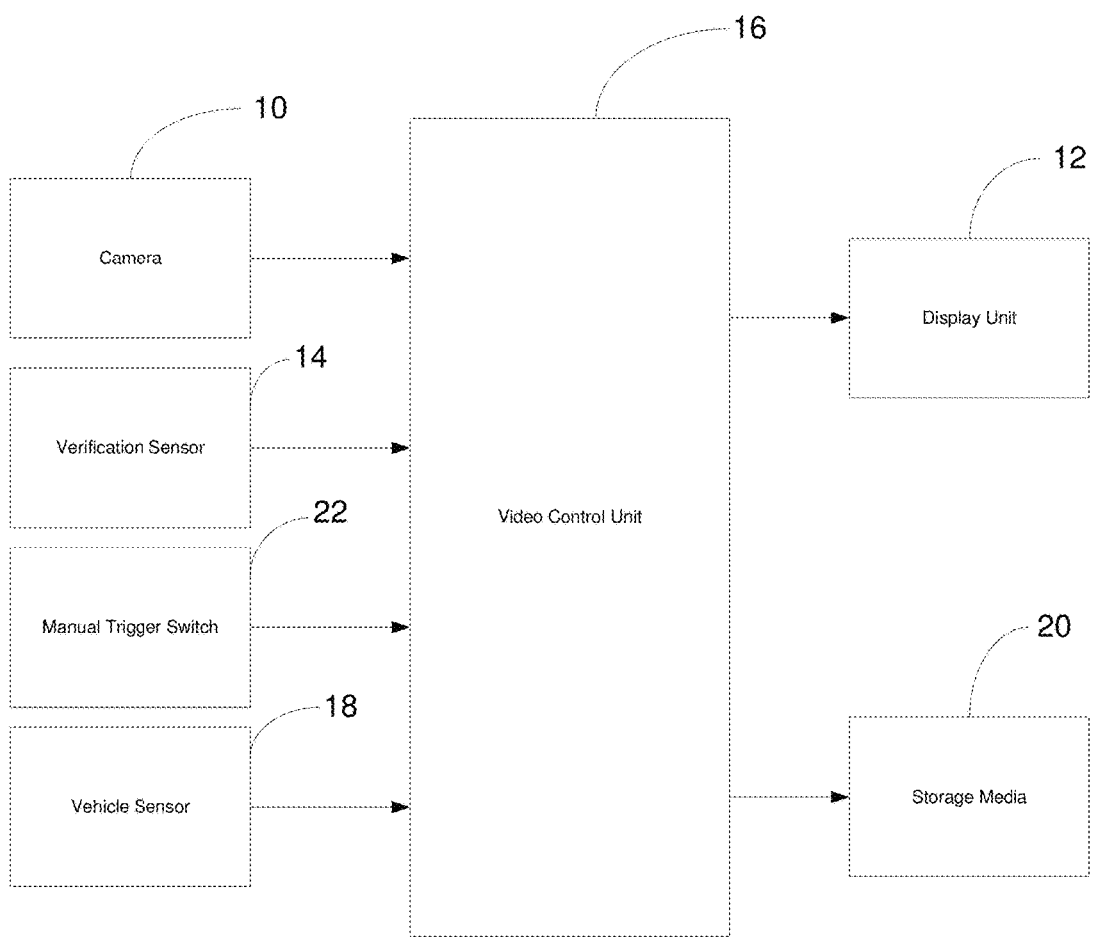
FIG. 1 shows a block diagram of a vehicle video display verification system in accordance with one embodiment of the present invention.

Referring to FIG. 1, a block diagram of a vehicle video display verification system is shown according to the present invention. The system includes a camera 10 carried by the vehicle. The camera 10 is constructed and arranged on the vehicle to capture images, preferably in the form of video, of an exterior area around the vehicle and transmit image information to a display unit for viewing by the vehicle driver.

Accordingly, the system includes a display unit 12 positioned in the vehicle so as to be viewable by the driver for displaying the images captured by camera 10. In one embodiment, display unit 12 includes a display panel comprised of an active-matrix liquid-crystal display of the type common to flat panel display designs. This is an often used type of display unit in vehicles, but the invention is not limited to this specific display type, which is provided by way of example.

The system further includes a verification sensor 14. Verification sensor 14 is configured to monitor the status of image information from camera 10 being displayed on display unit 12 and transmit feedback information about the status of images being displayed on display unit 12 to a video control unit 16. In one embodiment, verification sensor 14 is included in display unit 12 and is configured to determine an on/off status of the display panel of display unit 12. The on/off status of the display panel defines the feedback information transmitted to video control unit 16.

The video control unit 16 is operatively associated with camera 10, display unit 12 and verification sensor 14. Video control unit 16 is configured to receive and process the image information from camera 10 and output the processed image information to display unit 12 so that the image information is provided to display unit 12 in a format capable of display by display unit 12. Video control unit 16 is further configured to receive the feedback information from verification sensor 14. In operation, video control unit 16 records the image information from camera 10 and the feedback information from verification sensor 14 for establishing confirmation of an image display status on display unit 12 in the event of a vehicle accident.

In a preferred embodiment, the system further includes a vehicle sensor 18 in electronic communication with video control unit 16. Vehicle sensor 18 is configured to determine a change in vehicle status and transmit vehicle status information to video control unit 16. Video control unit 16 is further configured to determine when a vehicle crash event has occurred based on vehicle status information from vehicle sensor 18. In this embodiment, video control unit 16 is further configured to record the image information from camera 10, the feedback information from verification sensor 14, and the vehicle status information 18. In operation, video control unit 16 is further configured to save the recorded image information, feedback information, and vehicle status information on a storage media 20 operatively associated with video control unit 16.

In one embodiment, when a vehicle crash event is determined by video control unit 16, the image information, feedback information and vehicle status information are saved to storage media 20 for a predetermined time period both before and after determination of the vehicle crash event. For example, the information recorded by video control unit 16 up to 30 seconds before determination of the vehicle crash event, and for 30 seconds afterward is saved to storage media 20. In operation, the system is continuously recording information and overwriting previously recorded information. Once a crash event is determined, however, the information transmitted to storage media 20 is saved and protected to prevent overwriting of the saved information as video control unit 16 continues to record information. The portion of the recorded information for the predetermined time period before and after determination of a vehicle crash event is effectively locked on storage media 20 for later viewing. In one embodiment, storage media 20 includes a flash memory card removably carried by video control unit 16 for quick and convenient access to the saved information in the event of an accident.

In a preferred embodiment, verification sensor 14 comprises a secondary camera carried by the vehicle being positioned to capture images of display unit 12 displaying image information from camera 10. The images captured by the secondary camera define the feedback information transmitted to video control unit 16.

In a further embodiment, verification sensor 14 comprises an electrical current sensor configured to determine the flow of electrical current along electrical wire transmitting the image information from camera 10 to display unit 12. The electrical current sensor may be included as an integral component of video control unit 16, or as a stand-alone sensor operating in electronic communication with video control unit 16.

In another embodiment, verification sensor 14 comprises a light sensor mounted in front of display unit 12 that is configured to determine the output of light from display unit 12. In a preferred embodiment, the light sensor is shielded to resist interference from ambient light sources and mounted in close proximity in front of the display panel of display unit 12.

The various verification sensors 14 described herein can be used independently or in any combination to transmit feedback information to video control unit 16 about the status of image information from camera 10 being displayed on display unit 12.

Preferably, video control unit 16 includes an interface for engaging in electronic communication with the vehicle CAN bus for receiving various sources of vehicle status information. In addition to vehicle sensor information related to determining a vehicle crash event, supplemental information such as time, speed, temperature, braking, acceleration, and the like, can be recorded by video control unit 16 through the vehicle CAN bus. Likewise, such information may be transmitted directly from sensors to video control unit 16.

In one embodiment, vehicle sensor 18 includes at least one of an impact sensor, an airbag deployment sensor, and an accelerometer, or combinations thereof. Signal information from the vehicle sensor may be configured in direct electronic communication with video control unit 16, or can be received by video control unit 16 through the vehicle CAN bus.

In one embodiment, a manual trigger switch 22 is provided in electronic communication with video control unit 16. Video control unit 16 is configured to save the recorded image information, feedback information and vehicle status information on storage media 20 for a predetermined time period before and after actuation of manual trigger switch 22. This provides a driver with a manual option in the event of a minor incident that might not otherwise trigger a vehicle crash event determination by video control unit 16.

Figure 2:
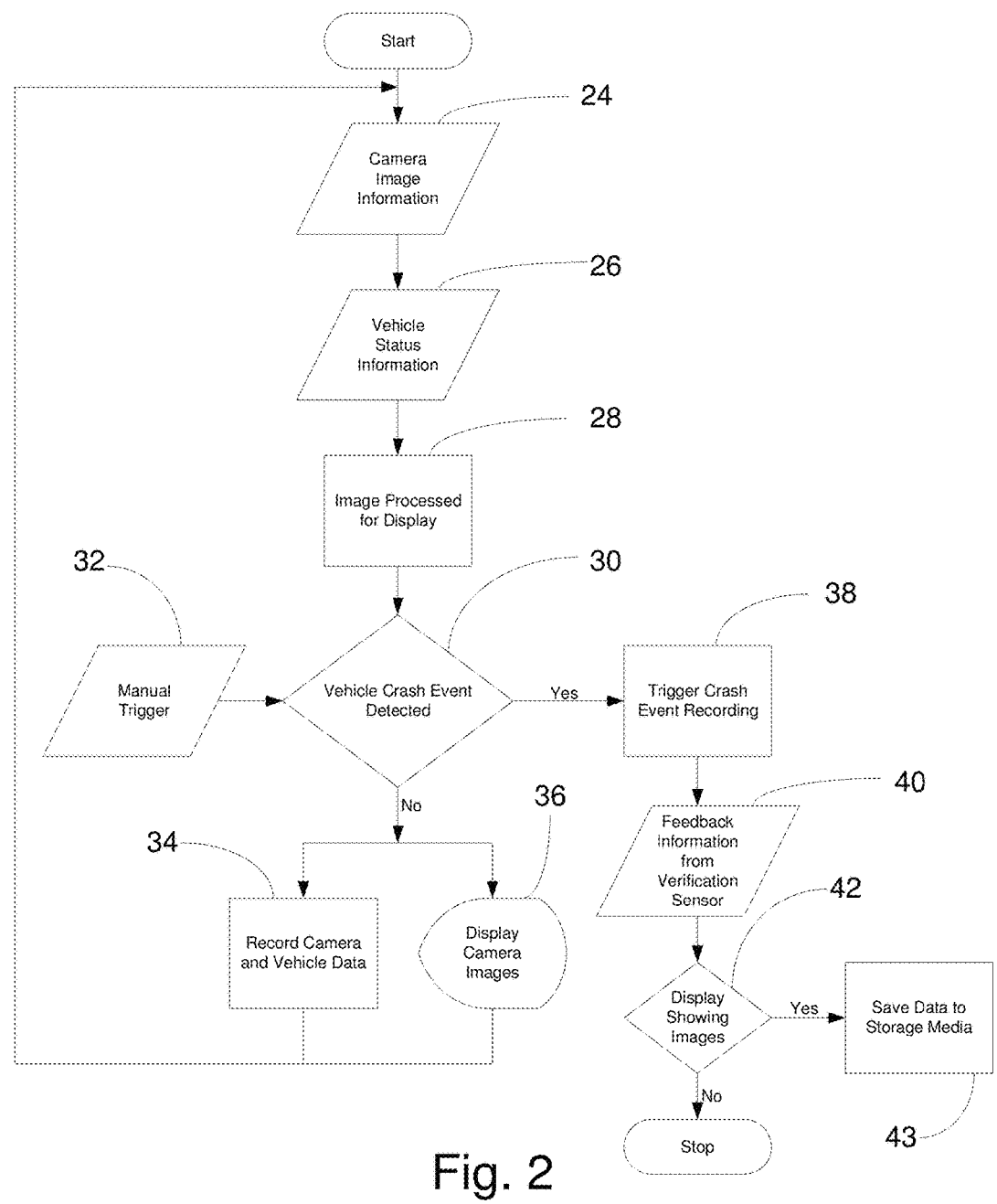
FIG. 2 shows a flow chart depicting various system steps in the implementation of the vehicle video display verification system in accordance with one embodiment of the present invention; and, FIG. 3 shows a block diagram of a video control unit in accordance with one embodiment of the present invention.
Figure 3:
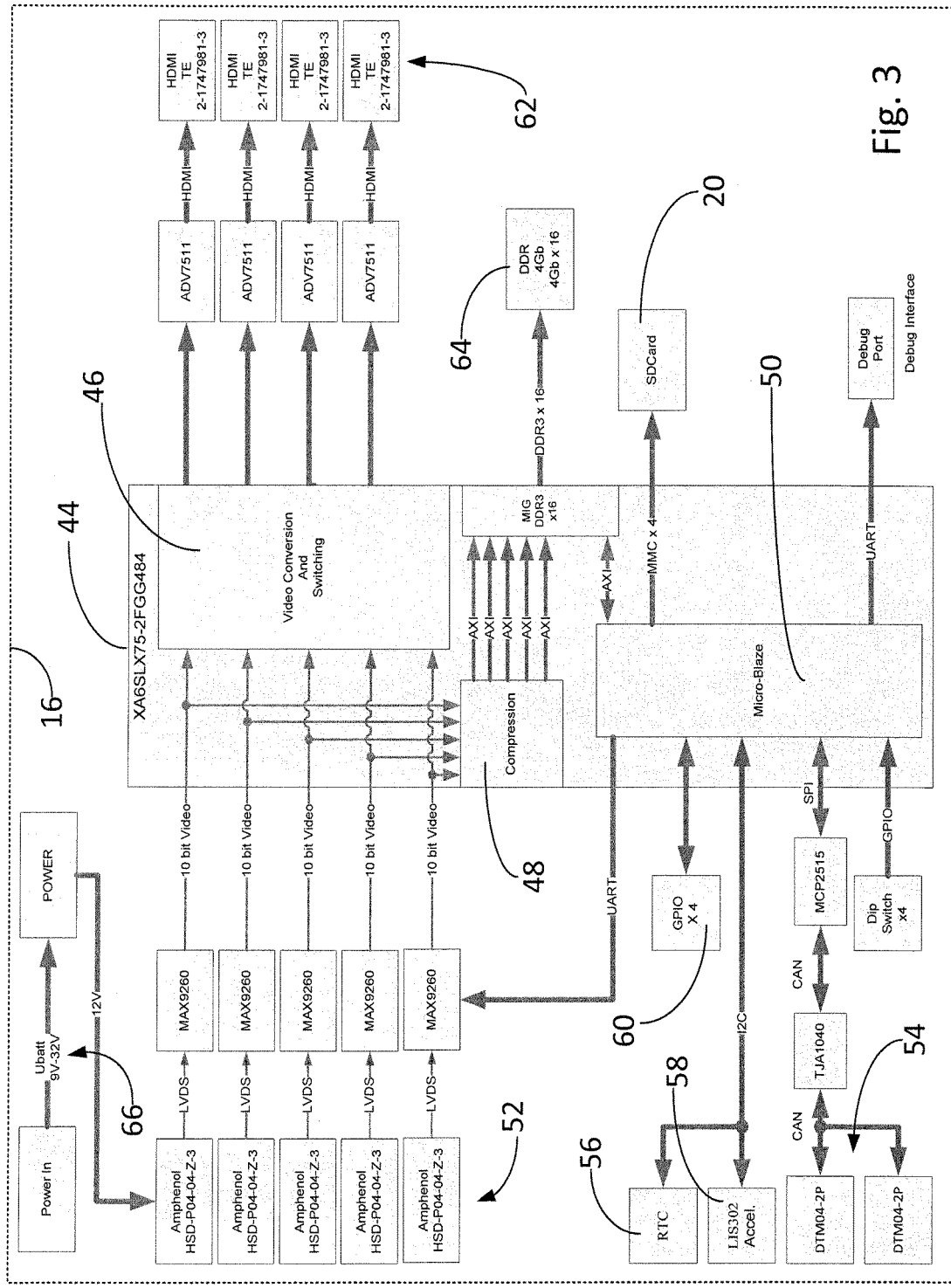

Referring to FIG. 2, a system operation flow chart is provided. The chart depicts various system steps in verifying the image status of display unit 12 and the evaluation of vehicle sensor information for determining a vehicle crash event that triggers the save feature of video control unit 16 to store predetermined time period of specified sensor data. The various steps are discussed herein below in more detail and with further reference to one embodiment of a video control unit 16 as illustrated in FIG. 3. As is understood by those skilled in the art, video control unit 16 may include any number of processors, micro-processors and other control circuitry to perform various routines and execute programming instructions to accomplish the stated functions herein. Additionally, various other common elements, such as memory, necessary to the proper function of the processors and control circuitry are also well know to those skilled in the art. For example, referring to FIG. 3, video control unit 16 may include a field-programmable gate array, designated generally as 44, which includes micro-processors for performing video conversion and switch 46, video compression 48, and interfacing with vehicle sensors and the vehicle CAN bus 50.

In step 24 of FIG. 2, camera image information is being transmitted to video control unit 16. Any number of cameras may be accommodated. As shown in FIG. 3, in one embodiment, video control unit 16 is constructed and arranged with a camera connection interface, designated generally as 52, accommodating up to five cameras to capture images in and around a vehicle.

In step 26 of FIG. 2, vehicle status information is also being transmitted to video control unit 16 from a vehicle sensor(s) 18. This vehicle status information can be provided via the vehicle CAN bus or directly from vehicle sensor 18 in electronic communication with video control unit 16. Referring to FIG. 3, video control unit 16 includes a CAN interface, designated generally as 54, for cooperating with the vehicle CAN bus to received various vehicle status information. Video control unit 16 is also illustrated as including a direct interface for a vehicle real time clock 56, as well as a direct interface for an accelerometer 58 for providing additional vehicle status information. Video control unit 16 further includes a plurality of general purpose input-output ports (GPIO), designated generally as 60, for interfacing with additional vehicle sensors 18, verification sensor(s) 14, and manual trigger switch 22.

In step 28 of FIG. 2, the image information from camera(s) 10 is processed and converted as necessary for display on display unit 12. Any necessary video switching of image information from a plurality of cameras is accordingly control by video control unit 16 for output and display on one or more display units 12. Referring to FIG. 3, in one embodiment, video control unit 16 is constructed and arranged to interface with four display units, designated generally as 62, for displaying various camera images to a driver. In the illustrated embodiment, video switching and conversion is controlled by micro-processor 46, which receives and processes the image information from camera(s) 10 and outputs a usable signal to display unit 12.

In step 30 of FIG. 2, video control unit 16 determines if a vehicle crash event has occurred based on the vehicle status information received from one or more vehicle sensors. For example, referring to FIG. 3, micro-processor 50 processes the information from the various sensor inputs 54, 58, 60 to analyze whether a trigger event has occurred. Accordingly, the system may analyze sensor input from an accelerometer in direct electronic communication with video control unit 16, as well as sensor input from an impact sensor and/or airbag sensor via the vehicle CAN bus interface 54 with video control unit 16.

Optionally, in step 32 of FIG. 2, the manual trigger switch 22 can be operated to trigger a vehicle crash event determination. Referring to FIG. 3, manual trigger switch 22 is operatively connect to video control unit 16 via one of GPIO ports 60.

Referring to steps 34 and 36 of FIG. 2, when no vehicle crash event is determined by video control unit 16 based on the vehicle status information, the image information and vehicle status information is continuously recorded on the available storage media of video control unit 16 and the processed camera image information transmitted to display unit(s) 12. Referring to FIG. 3, in the illustrated embodiment, to facilitate recording of the image information, a processor 48 operates to compress the data for temporary storage by memory unit 64. The system continuously records the information, overwriting prior recorded information until the determination of a vehicle crash event at step 30.

Referring to step 38 of FIG. 2, when video control unit 16 determines a vehicle crash event has occurred, for example, when an impact sensor input is received through the vehicle CAN bus to video control unit 16, the vehicle crash event recording is triggered.

Referring to steps 40 and 42 of FIG. 2, following determination of a vehicle crash event, feedback information from verification sensor 14, which is received by video control unit 16 is analyzed to determine if image information from camera(s) 10 is being displayed on display unit(s) 12. Referring to FIG. 3, verification sensor(s) 14 are connect to video control unit 16 via GPIO ports 60. One or more verification sensors 14 can be analyzed and/or required in order to make a determination of whether display unit 12 is displaying the image information from camera 10. For example, video control unit 16 may require that feedback information from a second camera as detailed above be provided to verify a display status of display unit 12.

Referring to step 43 of FIG. 2, following a determination that image information is displayed on display unit 12, the image information, feedback information, and vehicle status information is saved to storage media 20 for a predetermined time period before and after the trigger of the vehicle crash event determination. Referring to FIG. 3, in the illustrated embodiment, storage media 20 is a removable flash memory card operatively associated with video control unit 16. The recorded image information, feedback information and vehicle status information for the designated time period, which is held on memory unit 64, is transferred and saved to storage media 20. While the transfer and saving of information to storage media 20 is illustrated, it is not required and is done as a matter of practical convenience. The information to be saved can be stored and protected from overwriting in memory unit 64 if desired.

If a determination is made that no image information is being displayed on display unit 12, then no image information is saved to storage media 20 and the system process ends.

Referring to FIG. 3, in the illustrated embodiment, a battery backup power supply, designated generally as 66, is operatively associated with video control unit 16 for continued operation of video control unit 16 when vehicle power is lost. In the illustrated embodiment, battery backup 66 is included as an integral system component of video control unit 16.

Unless specifically stated otherwise, terms and phrases used in this document, and variations thereof, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A vehicle video display verification system, comprising:
   a camera carried by the vehicle;
   a display unit positioned in the vehicle displaying images captured by said camera;
   a verification sensor monitoring the status of image information from said camera being displayed on said display unit; and,
   a video control unit receiving said image information from said camera and outputting said image information to said display unit, and receiving feedback information from said verification sensor;
   wherein said video control unit is further configured to receive and record vehicle status information from at least one vehicle sensor to determine if a vehicle crash event has occurred;
   wherein said video control unit is further configured to analyze said feedback information to determine if said image information from said camera is being displayed on said display unit;
   wherein said video control unit records and saves said image information from said camera and said feedback information from said verification sensor upon a determination that said image information is being displayed on said display unit for establishing confirmation of an image display status and an on and off status of a display panel on said display unit in a vehicle crash event.

2. The system of claim 1, wherein said verification sensor comprises a secondary camera positioned within the vehicle capturing an image of said display unit in operation.

3. The system of claim 1, wherein said verification sensor comprises an electrical current sensor configured to determine a flow of electrical current along electrical wire transmitting said image information from said camera to said display unit.

4. The system of claim 1, wherein said verification sensor comprises a light sensor mounted in front of said display unit and configured to determine an output of light from said display unit.

5. The system of claim 1, wherein said video control unit is configured to continuously receive and continuously record said image information from said camera and said feedback information from said verification sensor.

6. The system of claim 1, wherein said video control unit is in electronic communication with a vehicle CAN bus for receiving said vehicle status information.

7. The system of claim 1, wherein said at least one vehicle sensor includes an impact sensor in electronic communication with said video control unit.

8. The system of claim 1, wherein said at least one vehicle sensor includes an accelerometer in electronic communication with said video control unit.

9. The system of claim 1, wherein said video control unit is further configured to save the recorded said image information, said feedback information and said vehicle status information on a storage media for a predetermined time period before and after determination of said vehicle crash event in a manner to prevent overwriting of the saved information.

10. The system of claim 9, wherein said storage media includes a flash memory card removably carried by said video control unit.

11. The system of claim 9, including a manual trigger switch in electronic communication with said video control unit, wherein said video control unit is further configured to save the recorded said image information, said feedback information and said vehicle status information on said storage media for a predetermined time period before and after actuation of said manual trigger switch.

12. The system of claim 1, including a battery backup power supply operatively associated with said video control unit for continued operation of said video control unit when vehicle power is lost.

13. A vehicle video display verification system, comprising:
- a camera carried by the vehicle capturing images of an exterior area around the vehicle and transmitting image information;
- a display unit positioned in the vehicle displaying said image information captured by said camera;
- a video control unit configured to receive and process said image information from said camera and output the processed said image information to said display unit so that said image information is provided to said display unit in a format capable of display by said display unit;
- a secondary camera carried by the vehicle being positioned to capture images of said display unit displaying image information from said camera, wherein said images captured by said secondary camera define feedback information transmitted to said video control unit;
- a vehicle sensor in electronic communication with said video control unit, wherein said vehicle sensor is configured to determine a change in vehicle status and transmit vehicle status information;
- wherein said video control unit is further configured to determine when a vehicle crash event has occurred based on said vehicle status information from said vehicle sensor; and,
- wherein said video control unit is further configured to record said image information, said feedback information, and said vehicle status information; and,
- wherein said video control unit is further configured to analyze said feedback information to determine if said image information from said camera is being displayed on said display unit; and,
- wherein said video control unit is further configured to save the recorded said image information, said feedback information, and said vehicle status information on a storage media operatively associated with said video control unit for a predetermined time period both before and after determination of said vehicle crash event upon a determination that said image information is being displayed on said display unit for establishing confirmation of an image display status and an on and off status of a display panel on said display unit in said vehicle crash event.

14. A vehicle video display verification system, comprising:
- a camera;
- a display unit displaying images captured by said camera;
- a video control unit operatively associated with said camera and said display unit, wherein said video control unit is configured to receive and transmit image information from said camera to said display unit;
- a verification sensor configured to monitor the display of images by said display unit and transmit feedback information to said video control unit; and,
- a vehicle sensor transmitting vehicle status information to said video control unit;
- wherein said video control unit is further configured to record said image information, said feedback information, and said vehicle status information; and,
- wherein said video control unit is further configured to determine a vehicle crash event based on said vehicle status information; and,
- wherein said video control unit is further configured to analyze said feedback information to determine if said image information from said camera is being displayed on said display unit; and,
- wherein said video control unit is further configured to save the recorded said image information, said feedback information, and said vehicle status information on a storage media for a predetermined time period both before and after determination of said vehicle crash event upon a determination that said image information is being displayed on said display unit for establishing confirmation of an image display status and an on and off status of a display panel on said display unit in said vehicle crash event.

15. The system of claim 14, wherein said vehicle sensor is selected from a group consisting of an impact sensor, an accelerometer, an airbag sensor and combinations thereof.

16. The system of claim 14, wherein said video control unit is in electronic communication with a vehicle CAN bus for receiving said vehicle status information.

17. The system of claim 14, wherein said storage media includes a flash memory card removably carried by said video control unit.

18. The system of claim 14, including a manual trigger switch in electronic communication with said video control unit, wherein said video control unit is further configured to save the recorded said image information, said feedback information and said vehicle status information on said storage media for a predetermined time period before and after actuation of said manual trigger switch.

* * * * *